July 25, 1961 J. D. PETERSON 2,994,054

SILICON PHOTODIODE

Filed Dec. 31, 1958 2 Sheets-Sheet 1

INVENTOR

John D. Peterson

BY Stevens, Davis, Miller & Mosher

ATTORNEYS

July 25, 1961 J. D. PETERSON 2,994,054

SILICON PHOTODIODE

Filed Dec. 31, 1958 2 Sheets-Sheet 2

INVENTOR

John D. Peterson

BY Stevens, Davis, Miller & Mosher

ATTORNEYS

United States Patent Office 2,994,054

Patented July 25, 1961

2,994,054

SILICON PHOTODIODE

John D. Peterson, Richardson, Tex., assignor to Texas Instruments Incorporated, Dallas, Tex., a corporation of Delaware Filed Dec. 31, 1958, Ser. No. 784,127

8 Claims. (Cl. 338—19)

The present invention relates in general to semi-conductor devices and has more particular reference to a photodiode assembly.

Accordingly, the present invention is directed to a method of manufacturing a photosensitive semiconductor transducer either of a type not sensitive to light source orientation or of a highly directional sensitive type.

The invention seeks to provide a novel photodiode assembly and method of assembly wherein the sensitive and fragile parts are encapsulated in a glass container. In the new photodiode assembly, the glass is closed so as to form a lens and parts are easily adjusted in position in order to obtain an optimum output from the device.

Basically, the present invention provides a novel photodiode construction and method of assembling the photodiode in a simple and economical manner.

Therefore, it is the object of this invention to produce a photo-sensitive semiconductor device comprising a sealed glass tube having a lens at one end and smaller tubes at the other end for admitting leads.

Also, it is an object of this invention to produce a direction sensitive semiconductor transducer formed by producing alternate N and P type layers, plating with an opaque metal, and then grinding off a corner to form a bevel so that a small area consisting of only the edges of the N and P type layers are exposed.

It is another object of this invention to produce an embodiment of a photosensitive semiconductor having nondirectional characteristics wherein a block having N and P type layers has a translucent layer formed on the side of the block facing the light source.

Furthermore, it is an object of this invention to enclose the semiconductor blocks in a sealed glass tube having a lens for focusing light which is integral with the tube.

The above and other objects and advantages of the invention will become apparent upon full consideration of the following detailed description and accompanying drawings in which.

All parts are greatly exaggerated in size in order to show details of construction.

It should be understood that although the invention has been illustrated specifically as applied to a photodiode, it will be apparent after reading the specification that portions of the invention are applicable to many forms of electronic tubes and are not necessarily restricted to photodiode construction.

Figure 1:
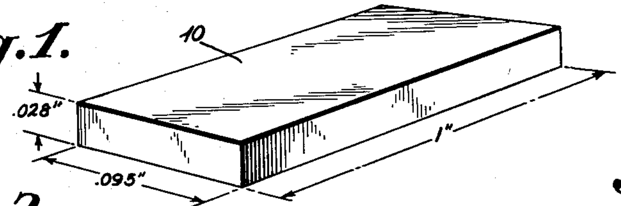
FIGURES 1 through 7 illustrate the steps in the preparation of the photosensitive material for a broad surface illuminated photodiode.

Referring now to the drawings in more detail, there is disclosed in FIGURE 1 the first step in the preparation of the photosensitive material used in a broad surface illuminated photodiode. Rectangular wafer 10 is cut from an N type silicon crystal. The surfaces of the wafer 10 are lapped. The dimensions of the specimen are, of course, variable as desired but, as an example it may be of the approximate dimensions of 1 inch long, 95 thousandths of an inch wide, and 28 thousandths of an inch high. Other semiconductor materials such as germanium can be used instead of silicon, but silicon is used as one specific embodiment of the invention described in the specification.

Figures 2, 3, 4, 5:
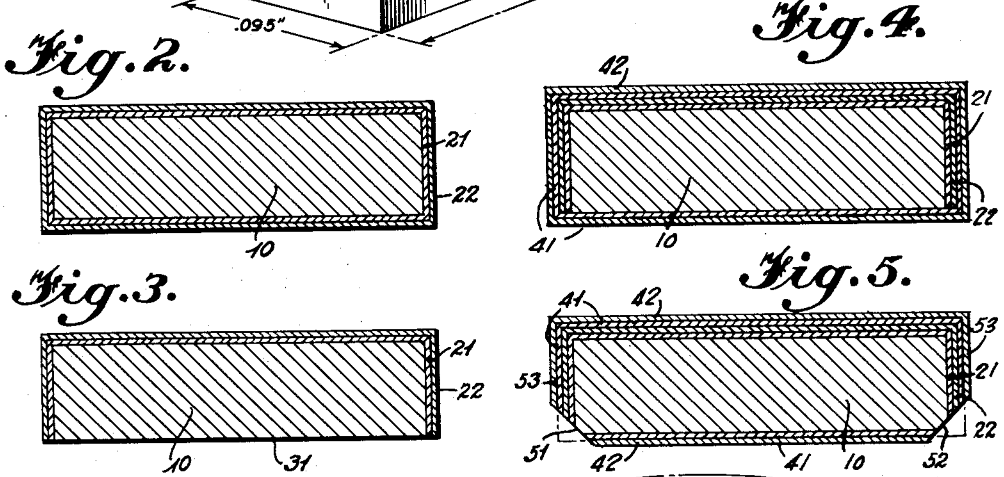

Silicon wafer 10 is then subjected to a process of double diffusion resulting in the N-P-N structure shown in FIGURE 2. Extremely thin diffused layers 21 and 22 of P and N conductivity type, respectively, are formed on the original silicon wafer 10. The bottom surface is then lapped to remove the diffused surfaces 21 and 22, leaving the bottom surface 31 of silicon wafer 10 exposed as in FIGURE 3. The entire wafer is then plated with nickel coating 41 and gold coating 42 over all surfaces, as shown in FIGURE 4. As shown in FIGURE 5, a beveled lap is then made along edges 51 and 52, exposing the junctions between wafer 10 and layer 21 and between layers 21 and 22.

Figure 6:
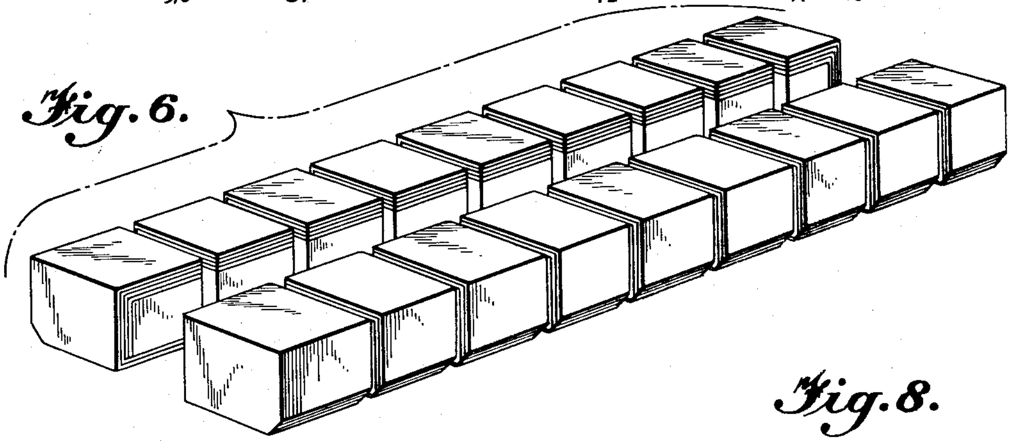

The silicon wafer 10, having been processed as described above, is then cut into squares of approximately 4 hundredths of an inch on a side, as in FIGURE 6, and a number of blocks of photosensitive elements 60 are ready for the manufacture of an equal number of photodiodes. Leads 71 and 72 are then soldered to the upper and lower surfaces 73 and 74, respectively, of each photosensitive element 60, and the completed wafer, as shown in FIGURE 7, is ready for etching.

The elements 60 are then etched by a suitable etchant conventional in the semiconductor art to clean the junctions. The function of the gold plating 42 is to protect covered areas from attack by the etching medium. Thus, any suitable material which will operate to keep the etching medium from attacking covered surfaces and particularly surface 53 can be used.

Figure 8:
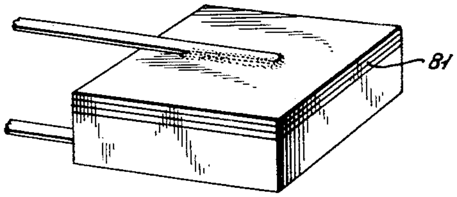
FIGURE 8 illustrates an edge illuminated type of photosensitive unit.

Thereafter, the elements 60 are subjected to an etch using aqua regia to remove the nickel plating 41 and gold plating 42 from surface 53. The broad illuminated surface on side 53 is shown whereby the light source illuminates an entire junction through the extremely thin diffused layer 22 of N-type material. Because of the large area of surface 53 which is sensitive to light, a photodiode using this form of photosensitive material is relatively insensitive to light orientation. In comparison, FIGURE 8 shows a type of edge illuminated photosensitive device which is sensitive to orientation with respect to a light source. In this type, only the edge 81 of the junction is sensitive to illumination. The broad surface device of FIGURE 7, in presenting a broad junction surface to a light source, yields a much higher output when subjected to the same illumination as the edge illuminated device of FIGURE 8. A slight variation in the manufacturing process described above omitting the step of removing the nickel and gold plating from the broad surface will produce a form of the edge illuminated device.

Figures 7, 8A:
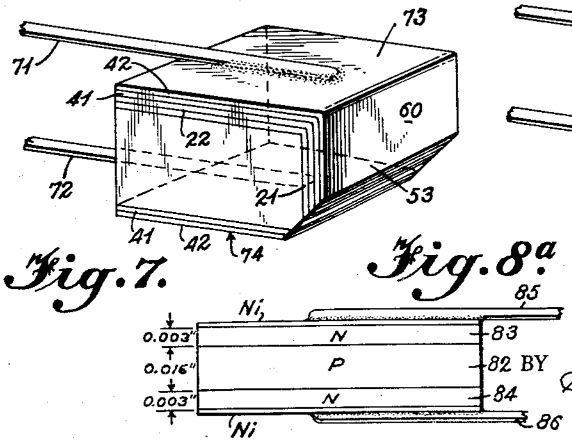

FIGURE 8*a* shows a further embodiment of the edge illuminated device. As shown, a wafer 82 of P type conductivity about 0.016 inch thick has diffused into opposite surfaces N type impurity atoms to form layers 83 and 84 about 0.003 to 0.004 inch deep. PN junctions are formed between layers 82 and 83 and between layers 82 and 84. Leads 85 and 86 are bonded to the opposite surfaces. Bonding is facilitated by the nickel plated on layers 83 and 84. The device is symmetrical both mechanically and electrically, and has the advantage of being able to be biased in either direction by an A.C. or D.C. signal.

Either of the type of devices shown may be used in the assembly of a photodiode. Also, the foregoing method described above can be employed in the preparation of P-N-P multiple junctions. This is accomplished by starting with a semiconductor body of N type material and reversing the order of diffusing the impurities into wafer 10.

Figure 9:
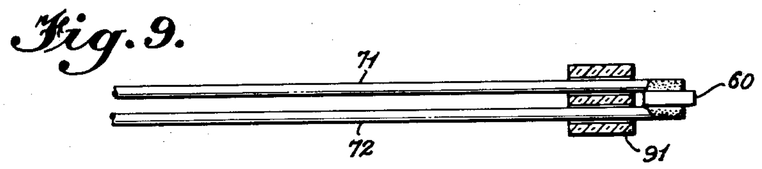
FIGURES 9 through 13 illustrate the steps in the encapsulating of the photosensitive unit in a header to complete the assembly of a photodiode.

FIGURE 9 illustrates the next step in completing the manufacture of the finished photodiode. The photosensitive element 60 with leads 71 and 72 soldered thereon has ceramic spacer 91 positioned on wires 71 and 72 near photosensitive element 60. A protective surface coating is applied over element 60.

Figure 10:
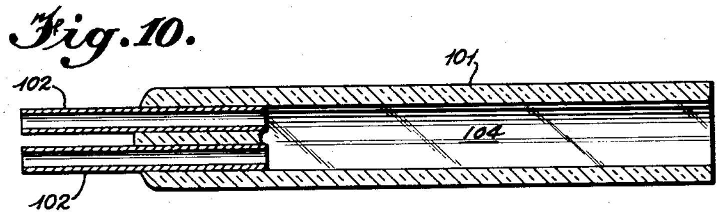
Figure 11:
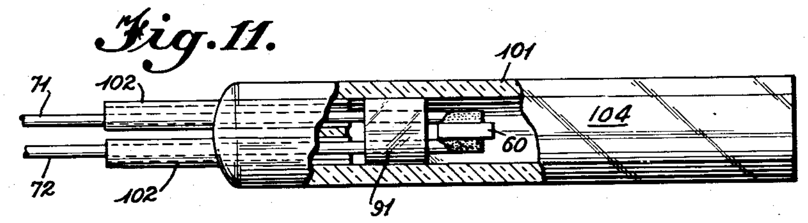

The header 104 shown in FIGURE 10 is used to encapsule the photosensitive unit of FIGURE 9. Header 104 comprises a transparent glass or similar type tube 101 with Kovar tubes 102 attached thereto using conventional glass to metal seals. The photosensitive unit of FIGURE 9 is then placed within the header unit 104 of FIGURE 10, as shown in FIGURE 11, by insertion through the open end of the tube 101. Wires 71 and 72 are passed through and extend out of the opposite ends of Kovar tubes 102. Ceramic spacer 91 holds the photosensitive unit centered in the tube 101.

Figure 12:
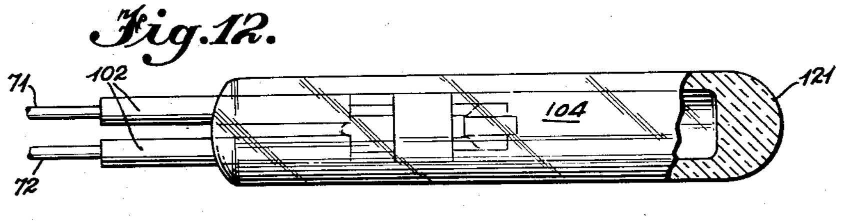
Figure 13:
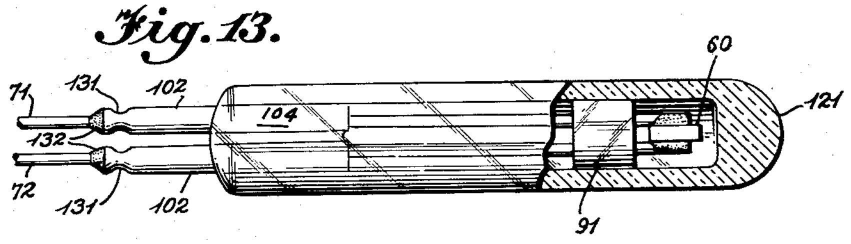

The header assembly containing the photosensitive unit with photosensitive element 60 located as far as possible away from the open end of glass tube 101 is then placed in the chuck of a rotating fixture, and the open end of the glass tube 101 is flame closed to produce a plano-convex lens 121, as shown in FIGURE 12. The photodiode assembly is then placed in a fixture having a light source and suitable readout facilities in order to adjust the photodiode for maximum output or any lower output which may be considered optimum. The photosensitive element 60 is adjusted in the glass tube 101 with respect to the focal point of the lens 121 for obtaining this optimum output. When the location of the photosensitive element 60 which gives optimum output is determined, the Kovar tubes 102 are crimped at points 131 and lead wires 71 and 72 are soldered to produce hermetic seals at points 132. Thus, the output of the device can be set at the optimum imparting exceptional versatility to the device.

Thus, a photodiode having all the advantages of miniature size can be produced by the method described above.

It should be understood, however, that the specific steps described with specific materials herein illustrated is intended to be representative only, as changes may be made without departing from the clear teachings of the invention. Accordingly, reference should be made to the following claims in determining the full scope of the invention.

What is claimed is:

1. A method of assembling a photosensitive device which comprises cutting a rectangular wafer from an N type semiconductor material, double diffusing said wafer whereby thin diffused layers of P and N type structure are formed on said wafer, lapping one side to remove said diffused layers, plating said wafer with an opaque conductive metal, removing said opaque conductive metal from sides which are to be sensitive to light, dividing said wafer into a plurality of photosensitive blocks, attaching leads to surfaces of each of said photosensitive blocks containing said metal and encapsulating each of said photosensitive blocks with said leads attached in a header.

2. The method of claim 1 in which said rectangular wafer of semiconductor material is of P type conductivity.

3. A method of assembling a photosensitive device which comprises cutting a rectangular wafer from an N type semiconductor material, double diffusing said wafer whereby thin diffused layers of P and N type structure are formed on said wafer, lapping one side to remove said diffused layers, plating said wafer with an opaque conductive metal, removing said opaque conductive metal from sides which are to be sensitive to light, dividing said wafer into a plurality of photosensitive blocks, attaching leads to surfaces of each of said photosensitive blocks containing said metal, inserting one of said photosensitive blocks with said leads attached into the open end of a glass tube so that said leads are threaded through metal tubes placed through the opposite end of said glass tube, rotating said glass tube with the open end in a flame, closing said glass tube, producing a plano-convex lens on the end of said tube closed in the flame, adjusting said photosensitive block in respect to the focal point of said plano-convex lens, and crimping said metal tubes and said leads to prevent movement of said photosensitive block along said glass tube.

4. A method of assembling a photosensitive device which comprises double diffusing a wafer of semiconductor material, plating said wafer with an opaque conductive metal, dividing said wafer into sensitive rectangular elements, soldering leads on each of said sensitive elements, etching each of said sensitive elements to remove opaque metal from surfaces which are to be sensitive to light, positioning a ceramic spacer on said leads near each of said sensitive elements, and encapsulating each of said sensitive elements in a header.

5. A method of assembling a photosensitive device which comprises double diffusing a wafer of semiconductor material, plating said wafer with an opaque conductive metal, dividing said wafer into sensitive rectangular elements, soldering leads on each of said sensitive elements, etching each of said sensitive elements to remove opaque metal from surfaces which are to be sensitive to light, positioning a ceramic spacer on said leads near each of said sensitive elements, inserting said leads with each of said sensitive elements into a glass tube which is open at one end, threading said leads through metal tubes at the opposite end of said glass tube so as to position each of said sensitive elements away from the open end of said glass tube, flame closing the open end of said glass tube, and simultaneously producing a plano-convex lens with the molten glass on the end of said glass tube in the flame, adjusting each of said sensitive element whereby a sensitive element is placed at the focal point of said lens resulting in optimum output from said sensitive element, and crimping said leads and said metal tubes thereby maintaining the position of each of said sensitive elements.

6. A method of assembling a photosensitive device which comprises inserting a sensitive element with leads attached into a glass tube having metal tubes protruding from one end, threading said leads through said metal tubes, flame closing said glass tube to form a plano-convex lens on said glass tube, and adjusting the position of said sensitive element with respect to the focal point of said lens whereby an optimum output is obtained from the sensitive element.

7. An electrical device comprising an envelope having a cylindrical wall, a pair of metal tubes extending into and sealed to said envelope, a pair of leads extending from said envelope with each of said leads passing through one of said metal tubes, a wafer of semiconductor material within said envelope attached to said leads, a ceramic wafer through which said leads pass whereby said wafer of semiconductor material and said leads are centered diametrically within said envelope, a lens section of said envelope to focus light onto said wafer of semiconductor material, and means for sealing each of said metal tubes to hold said leads, said device so constructed and arranged that prior to the application of said sealing means said wafer of semiconductor material may be positioned relative to said lens to produce a desired output.

8. An electrical device comprising an envelope, multiple metal tubes extending into and sealed to said envelope, multiple leads extending from said envelope with each of said leads passing through and sealed within one of said metal tubes, a wafer of semiconductor material of one-type conductivity having opposed regions of opposite-type conductivity formed therein located within said envelope and attached to said leads, and a lens to direct radiant energy onto said wafer of semi-conductor material, said lens being formed as an integral part of said envelope, said device being so constructed and arranged that prior to sealing said leads within said metal tubes, said wafer of semiconductor material can be positioned relative to said lens to obtain a desired output from the device.

References Cited in the file of this patent

UNITED STATES PATENTS

| | | |
|---|---|---|
| 2,493,919 | Holmes | Jan. 10, 1950 |
| 2,668,867 | Ekstein | Feb. 9, 1954 |
| 2,669,663 | Patchechnikoff | Feb. 16, 1954 |